May 25, 1926.  F. H. NORTON  1,586,459
PISTON RING
Filed Jan. 29, 1924
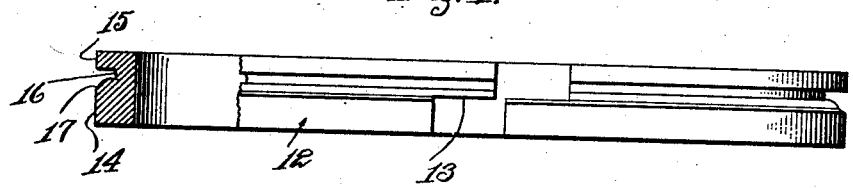
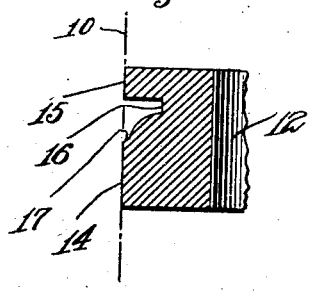
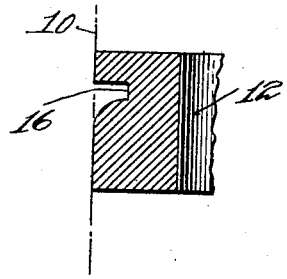
Inventor
Fred H. Norton.
By
Attorney Patented May 25, 1926.

1,586,459

UNITED STATES PATENT OFFICE.

FRED H. NORTON, OF MANCHESTER, CONNECTICUT.

PISTON RING.

Application filed January 29, 1924. Serial No. 689,284.

This invention relates to new and useful improvements in packing rings, and particularly to piston packing rings used in explosive and internal combustion engines.

One object of the invention is to provide a piston packing ring which will effectively retain the pressure of the explosion against passage back of the piston, and also prevent passage of lubricant to the explosion chamber.

Furthermore, the ring is designed to properly distribute lubricant along the wall of the cylinder of the engine, while at the same time scraping off the excess, so that it cannot escape or pass the piston and enter the combustion chamber.

A further object is to provide a peripherally grooved piston packing ring having one wall of the groove curved, and the contacting face of the ring so formed that the ring will wear to a perfect fit before wear takes place on the curved face, with the result that the lubricant will be properly distributed in a thin film on the cylinder wall, as the piston moves in one direction, and also retain the lubricant within the groove to provide a seal against the passage of gases or lubricant past the piston.

Other objects and advantages will be apparent from the following description when taken in connection with the accompanying drawing.

In the drawing:

Figure 1 is an elevation of a piston ring made in accordance with the invention, and partly in section.

Figure 2 is an enlarged fragmentary sectional view of the ring when the ring is first placed in the piston and cylinder.

Figure 3 is an enlarged fragmentary sectional view showing the ring after it has properly worn to fit against the cylinder wall.

Referring particularly to the accompanying drawing, 10 represents an engine cylinder wall, against which the contacting face of the piston ring 12 is arranged to engage, this ring being arranged to be placed in a groove in the exterior wall of a piston, not shown, but which will be readily understood.

The ring consists of a body, rectangular in cross section, and being split and formed with the step-lap joint 13. The outer peripheral face of the ring, or that portion which bears against the cylinder wall, is formed with two portions 14 and 15, the former of which is approximately twice as wide as the latter, and between these portions there is formed a channel or groove 16, extending throughout the entire circumference of the ring. The wall of the groove, which meets the inner edge of the narrow face 15, meets said face, and the bottom wall of the groove, at right angles, at both points, while the other wall of the groove curves outwardly from the bottom of the groove to a point or line slightly inward of the said wide face portion 14. From this last-named line, and extending obliquely in the direction of, and meeting the adjacent edge of said wider face portion 14, is a narrow wall or face 17.

When the ring is first placed in the piston groove, and the piston operated in the cylinder, the portion of the face 14, between its outer wall contacting part and the portion lying in the plane of the outer end of the curved portion, as well as an equal part of the thickness of the ring in the narrow face 15, will wear down to a perfect fit to the wall of the cylinder, before it reaches the curved portion or wall of the groove.

In the operation of the ring, when the piston moves toward the compression end of its stroke, oil, which lies within the groove of the piston ring, will form a seal to prevent escape of gases past the piston, while at the same time said oil will roll on the curved wall of the groove, and against the cylinder wall, to spread a thin film thereon. The oil rolled from the convex face, onto the cylinder wall, is generally of too great volume for the efficient lubrication of the wall and piston, and acts as a wedge to contract the ring, with the result that a certain portion of the oil will be blown into the combustion chamber. To obviate this, the short oblique portion 17, of the wall of the groove, serves to cut, or reduce the thickness of this film of oil to such a degree that none of such film of oil will be blown into the combustion chamber. Furthermore, the excess, shaved off by the sharp edge formed at the junction of the oblique portion and the cylinder contacting face of the ring, will be retained in the groove, whereby to more effectively form an oil seal against possibility of entrance of lubricant into the combustion chamber. When the piston moves in the other direction, the angle formed by the meeting edges of the narrow face portion 15 and the adjacent wall of the groove 16 will scrape the excess oil from the cylinder wall, and carry same within the groove, to the other end of the piston stroke. Thus the compression will be effectively held up, while at the same time the oil will be held down. This will result in a more perfect combustion above the piston, and maintain the terminals of the spark plugs in a clean condition, because of the fact that no oil will gain access to the combustion chamber to cause deposit of carbon on the electrodes of the plugs.

What is claimed is:

A piston ring having a circumscribing groove in its cylinder contacting face, said groove having side and bottom walls, one side wall of the groove having a convex portion originating at the bottom wall of the groove and terminating inwardly of the cylinder contacting face of the ring, and an oblique portion extending from the outer terminus of the convex portion and meeting the said cylinder contacting face at an obtuse angle, that portion of the cylinder contacting face of the ring including the oblique portion being adapted to initially distribute oil on the cylinder wall and to be subsequently worn away.

In testimony whereof, I affix my signature.

FRED H. NORTON.